(12) United States Patent
Yamakura et al.

(10) Patent No.: US 7,554,769 B2
(45) Date of Patent: Jun. 30, 2009

(54) THIN FILM MAGNETIC HEAD AND HEAD GIMBAL ASSEMBLY

(75) Inventors: Hideo Yamakura, Kanagawa (JP);
Kiyonori Shiraki, Kanagawa (JP);
Tatsumi Tsuchiya, Kanagawa (JP);
Masanori Tanabe, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 690 days.

(21) Appl. No.: 11/101,189

(22) Filed: Apr. 6, 2005

(65) Prior Publication Data

US 2005/0219753 A1  Oct. 6, 2005

(30) Foreign Application Priority Data

Apr. 6, 2004  (JP) .............................. 2004-111870

(51) Int. Cl.
*G11B 5/127* (2006.01)
(52) U.S. Cl. .................................. 360/234.5
(58) Field of Classification Search ............... 360/234.5
See application file for complete search history.

(56) References Cited

U.S. PATENT DOCUMENTS

| 7,164,555 B2* | 1/2007 | Kato et al. .................. 360/128 |
| 7,352,524 B2* | 4/2008 | Kiyono et al. ................. 360/75 |
| 7,359,149 B2* | 4/2008 | Kiyono et al. ............ 360/234.5 |
| 2006/0034014 A1* | 2/2006 | Kato et al. .................. 360/128 |
| 2006/0087770 A1* | 4/2006 | Kato et al. ................ 360/234.5 |
| 2006/0268459 A1* | 11/2006 | Ohtsu et al. .............. 360/234.5 |
| 2007/0201165 A1* | 8/2007 | Kato et al. ............... 360/234.5 |

FOREIGN PATENT DOCUMENTS

| JP | 58-143415 | 8/1983 |
| JP | 05-298646 | 11/1993 |
| JP | 2000-251217 | 9/2000 |
| JP | 2001-101634 | 4/2001 |
| JP | 2003-091804 | 3/2003 |
| JP | 2003-167274 | 6/2003 |

\* cited by examiner

*Primary Examiner*—Allen T Cao
(74) *Attorney, Agent, or Firm*—Townsend and Townsend and Crew LLP; John Henkhaus

(57) ABSTRACT

In the case of employing the wire bonding for the actual element detection in the air bearing surface polishing process and the solder bonding for the connection between the terminals in the assembly process, it has been virtually impossible to satisfy requirements of both of the wire bonding and the solder bonding. According to the embodiment of the invention an MR head and a write head are stacked on an element formation surface of a slider. A lead line connected to electrodes of the MR head is connected to MR element terminals 20 via a copper stud. An outgoing line from coils of the write head is connected to write element terminals via a copper stud. The stacked body of the MR head and the read head, the lead line, and the coil outgoing line are covered with an alumina protection film. The MR element terminals and the write element terminals are formed on the alumina protection film. Each of the MR element terminals and the write element terminals has a slit and is sectioned in a height direction of the slider by the slit.

20 Claims, 13 Drawing Sheets

WRITE ELEMENT TERMINALS    MR ELEMENT TERMINALS

THIN FILM MAGNETIC HEAD AND HEAD GIMBAL ASSEMBLY

CROSS-REFERENCES TO RELATED APPLICATIONS

This application claims priority from Japanese Patent Application No. JP2004-111870, filed Apr. 6, 2004, the entire disclosure of which is incorporated herein by reference.

BACKGROUND OF THE INVENTION

The present invention relates to a thin film magnetic head using a magneto resistive element as a read element and to a head gimbal assembly having a gimbal on which the thin film magnetic head is mounted. In particular, the invention relates to structures of terminals connected to the magneto resistive element.

Magnetic disk drives have been downsized and increased in capacity in recent years. Small magnetic disk drives using disks having a diameter of about 90 mm (3.5 inches) and a diameter of about 63.5 mm (2.5 inches) have become mainstream. Since a disk speed is relatively slower in the small disk drives, a problem of reduction in read output is detected with an inductive magnetic head in which the read output depends on the disk speed. To the contrary, since the read output does not depend on the disk speed in a magneto resistive head using a magneto resistive element whose resistance changes depending on a change in magnetic field, the magneto resistive head can provide a high read output in the small magnetic disk drives. Since the magneto resistive head contributes to providing the high read output as compared with the inductive magnetic head even when the track is narrowed to increase density, the magneto resistive head is considered as a thin film magnetic head suitable for downsizing and large capacity.

There are three types of magneto resistive heads: an MR (Magneto Resistive) head using an MR element, a GMR (Giant Magneto Resistive) head using a GMR element, and a TMR (Tunneling Magneto Resistive) head using a TMR element. In this specification, the three heads are collectively referred to as an MR head.

Since the resistance change of the MR element caused by a change in magnetic field is detected in the MR head, a structure of the MR head wherein the MR element is exposed to a slider surface (hereinafter referred to as "air bearing surface") opposed to a disk provides the highest read efficiency. The exposed type MR head of which the MR element is exposed to the air bearing surface has an MR element edge exposed to the air bearing surface. The exposition of the MR element edge is achieved by polishing part of the MR element during the processing of the air bearing surface. A dimension extending in a direction perpendicular to the air bearing surface of the MR element is called an MR element height, which is controlled by the polishing. Since the read output of the MR head changes depending on the MR element height, the read output is undesirably fluctuated when the MR element heights are varied. Therefore, in order to suppress the read output fluctuation of the MR head, it is necessary to control the MR element heights highly accurately in the polishing.

Since the sensitivity is increased with a reduction in MR element height, the height is getting shorter and shorter yearly. At present, the MR element height is from 0.1 to 0.4 mm and will be reduced to less than 0.1 mm for a thin film magnetic head to be mounted on a magnetic disk drive having a surface recording density of 100 Gbit/in$^2$ or more. Accordingly, a demanded level for the processing accuracy of the MR element height tends to be increased year by year. In addition, it is considered that the processing accuracy demanded for the thin film magnetic head to be mounted on the magnetic disk drive with the surface recording density of 100 Gbit/in$^2$ or more will be ±0.02 mm or less.

In general, the MR element heights are controlled by polishing in such a manner that resistances of a pattern for measurement (hereinafter referred to as "resistance detection elements") which is formed separately from the MR elements during an element formation process are measured. Then the measured resistances are converted into MR element heights so as to monitor and control the MR element heights during the polishing. For the control method for the MR element heights in a row bar, the MR element heights obtained by converting the resistances of the resistance detection elements formed on several tens of positions in a row bar are approximated by a quadratic curve or a quartic curve, and then a load to be applied on the row bar is controlled during the polishing so as to keep a slope component, a quadratic curve component, and a waviness component of the approximation curve as small as possible.

Further, a thin film magnetic head manufacturing process generally includes two processes for polishing the air bearing surface, i.e., the element height controlling and polishing process for mainly controlling the MR element heights and a bar touch lapping process for reducing a flatness, a surface coarseness, and residual steps of the air bearing surface. A representative method of the bar touch lapping process is disclosed in Japanese Patent Laid-open No. 05-298646 wherein a row bar is brought into close contact with a polishing stool by adhering the row bar to a jig via an adhesive elastic body so that a shape of the stool is transferred to an air bearing surface.

In order to process the MR element heights with increased accuracy, it is considered effective to control a polishing load based on the resistances of the resistance detection elements obtained by in-process monitoring the resistances in the bar touch lapping process. In this case, it is possible to in-process monitor the resistances of the resistance detection elements during the polishing by connecting the resistance detection elements to a measurement circuit of a polisher employing wire bonding as disclosed in Japanese Patent Laid-open No. 2001-101634.

SUMMARY OF THE INVENTION

In order to process the MR element heights highly accurately in the air bearing surface polishing process of the thin film magnetic head, it is most effective to control a polishing load so that resistances of MR elements obtained by in-process monitoring during polishing reach a desired level. In order to in-process monitor the resistances of the MR elements during the polishing, it is necessary to connect terminals of the MR elements to a terminal of a measurement circuit by wire bonding. The wire bonding has the following features.

In the bar touch lapping, the row bar is fixedly adhered to the adhesive elastic body at a portion about 0.2 to 1 mm away from its facet. When the wire bonding is applied to a position close to a back face of the row bar, a capillary or a wire bonding tool comes in contact with the adhesive elastic body. Thus, it is difficult to employ the wire bonding in the bar touch lapping.

Also, a method of applying the wire bonding to the terminals of the row bar often includes wedge bonding wherein wire residue is reduced. Since a PCB substrate to which the terminals are to be connected is located on the back face of the row bar in the wedge bonding, the wire is extended from the terminals to the back face of the row bar. In this case, when the wire boding is applied to a position close to the back face of the row bar, the wire interferes with the facet of the adhesive elastic body to cause a tensile stress on the wire. Thus, the wedge bonding is subject to wire bonding failure.

In view of the above features, it is desirable to apply the wire bonding to a position as close as possible to the bearing surface on the terminals connected to the MR elements when employing the wire bonding in the bar touch lapping.

On the other hand, in a head gimbal assembly process, the slider is adhered to the gimbal and wiring on the gimbal is connected to the terminal connected to the write element and the MR element. In this case, solder bonding is employed as a method of connecting the wiring on the gimbal to the terminals of the write element and the MR element. In the solder bonding, when a distance between the terminals to be connected is increased, a portion near the center of the solder which is a connecting material is tied up to deteriorate connection reliability. Therefore, it is desirable that the terminals of the head elements are located at positions as close to the slider back face as possible in the solder bonding. Further, when a height of each of the terminals is larger than a width of the terminal in the solder bonding, the solder is spread over to wet the terminal so that the portion near the center of the solder is tied up, resulting in deterioration in connection reliability.

In view of the above, the following problems arise in the case where the wire bonding for the actual element detection is employed in the bearing surface processing and the solder bonding is employed for connecting the terminals in the assembly.

(1) The terminals must be placed at positions close to the bearing surface of the magnetic head slider in the wire bonding.

(2) The terminals must be placed at positions close to the back face of the magnetic head slider in the solder bonding.

(3) The portion near the center of the solder bonding is tied up when the height of each of the terminals is larger than the width thereof, deteriorating the connection reliability.

A feature of the present invention is to provide a terminal structure of a thin film magnetic head, which enables to employ wire bonding for connecting a terminal of a measurement circuit to terminals connected to an MR element in a polishing process and to employ solder bonding for connecting a wiring on a gimbal to the terminals connected to the write element and the MR element in an assembly process.

Another feature of the invention is to provide a head gimbal assembly having a high degree of connection reliability between the wiring on the gimbal and the terminals connected to the write element and the MR element.

According to an aspect of the present invention, a terminal connected to a magneto resistive element or terminals connected to the magneto resistive element and a magnetic recording element of a slider are each formed with a slit elongated in a width direction of the slider so as to section the terminal into two terminal portions in a height direction of the slider, one of the terminal portions (near an air bearing surface) being connected by wire bonding and the other (near a back face) being connected by solder bonding.

According to the invention, it is possible to provide a terminal structure of a thin film magnetic head, which enables to employ the wire boding for connecting a terminal of a measurement circuit to terminals connected to an MR element in a polishing process and to employ the solder bonding for connecting wiring on a gimbal to terminals connected to a write element and the terminals connected to the MR element in an assembly process.

In addition, it is also possible to provide a head gimbal assembly having a high degree of connection reliability between the wiring on the gimbal and the terminals connected to the write elements and the MR elements.

DETAILED DESCRIPTION OF THE INVENTION

Figure 1:
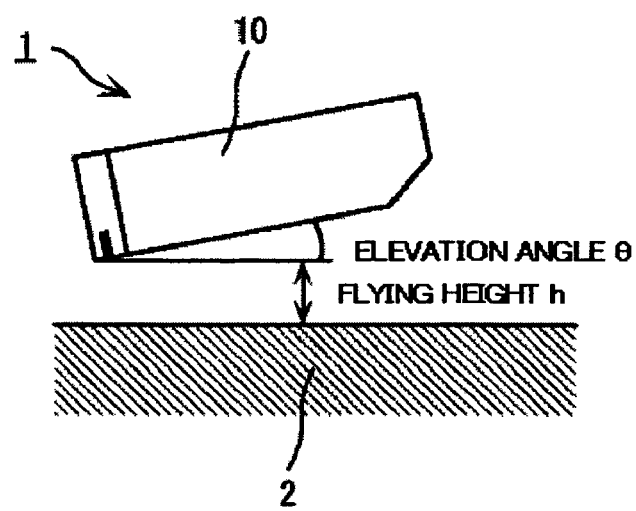
FIG. 1 is a diagram showing an arrangement of the thin film magnetic head and a magnetic disk.

The outline of a magnetic disk drive unit will first be described. FIG. 1 is a diagram showing the arrangement of a slider 10 of a thin film magnetic head 1 and a magnetic disk 2 which is a magnetic recording medium. A dynamic pressure caused by the rotation of the magnetic disk 2 is used to allow the slider 10 to fly in close spacing above the surface of the magnetic disk 2 so that a magnetic inductive head and an MR head formed on an edge of the slider 10 can read and write data. The spacing between the surface of the magnetic disk 2 and the slider 10 is referred to as a flying height h, and an angle formed by the slider 10 and the magnetic disk 2 is referred to as an elevation angle θ.

Figure 2:
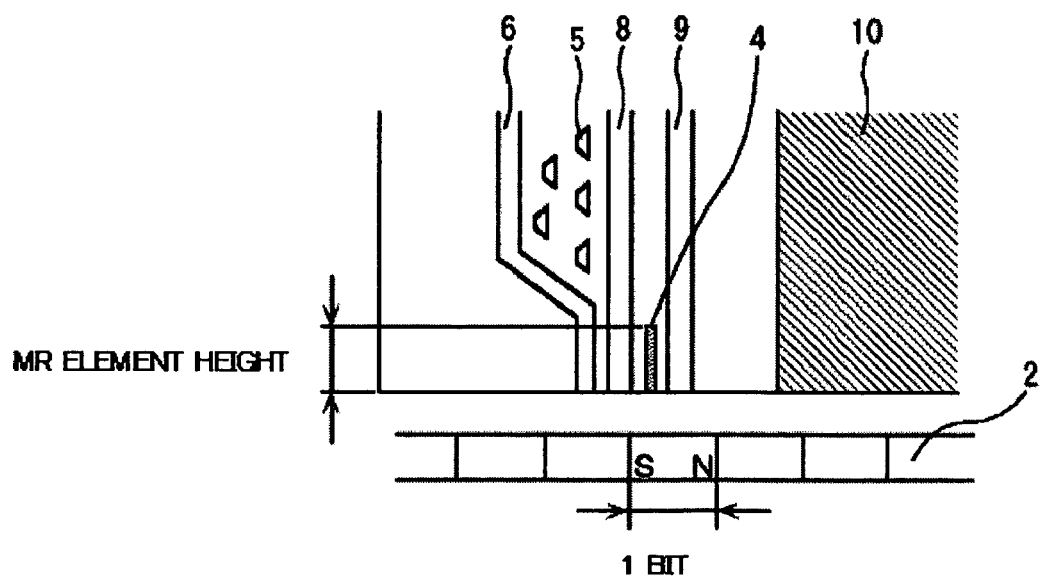
FIG. 2 is a sectional view showing a portion of the thin film magnetic head facing the medium.

FIG. 2 is a partial sectional view showing the magnetic inductive head and the MR head of the thin film magnetic head facing the medium. The magnetic reading and writing using the magnetic inductive head and the MR head are performed in the manner described below. The data writing is performed when the surface of the magnetic disk 2 is magnetized by coils 5 and an upper magnetic film 6. The magnetized surface of the magnetic disk 2 and the slider 10 move relative to each other to change resistance of an MR element 4 owing to polarities S and N written on the magnetic disk 2. By detecting the change in resistance of the MR element 4, data written on the surface of the magnetic disk 2 are read.

Figure 3:
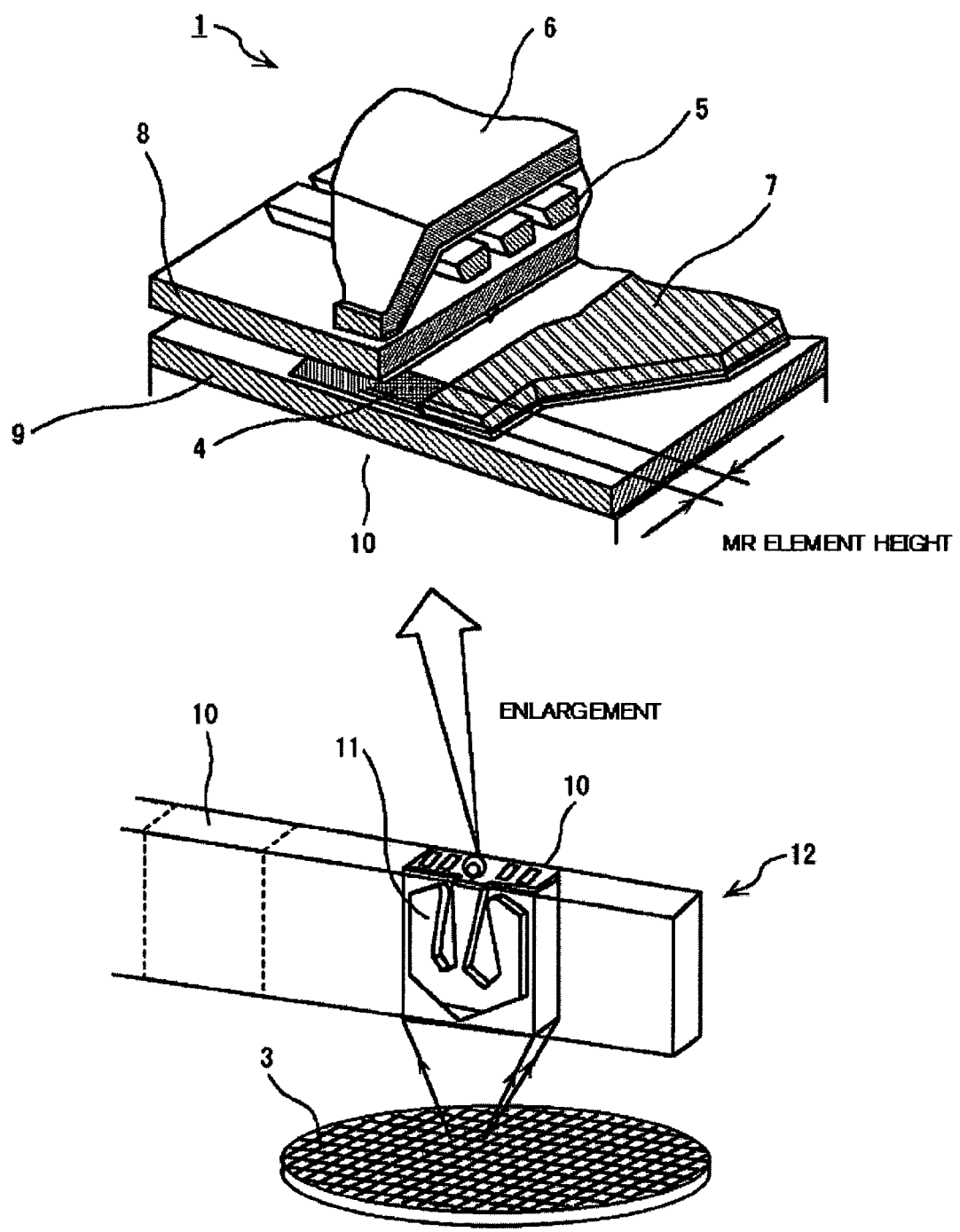
FIG. 3 is a diagram showing a configuration of the thin film magnetic head and a relationship among a wafer, a row bar, and a slider.

FIG. 3 is a diagram showing the structure of the thin film magnetic head 1 and the relationship between a wafer 3, a row bar 12, and the slider 10. MR elements and write elements are formed on a surface of the wafer 3 made from ceramics by thin film formation technologies such as sputtering, mask formation, and etching. The wafer is cut into the row bars 12 each having a plurality of sliders 10 successively formed. The row bar 12 is cut into the thin film magnetic heads 1.

Next, the structure of an element portion will be described. The write element is constituted of the coils 5, the upper magnetic film 6, and an upper shield film 8. An edge of the upper magnetic film 6 is exposed to an air bearing surface 11, and the exposed portion serves to write data. The MR element 4 is disposed in the vicinity of the upper magnetic film 6, and an electrode 7 is formed on each of ends of the MR element. In order to reduce noise generated when the MR element 4 reads data, the MR element 4 is sandwiched between the upper shield 8 and a lower shield 9.

Since the MR element 4 of the thin film magnetic head 1 of the exposed MR head type is exposed to the air bearing surface 11 by polishing, an MR element height which is a height in a direction perpendicular to the bearing surface 11 is determined by the polishing. Since the MR element height greatly influences a read output at the time of reading data, a processing tolerance for the polishing is very low.

Figure 4:
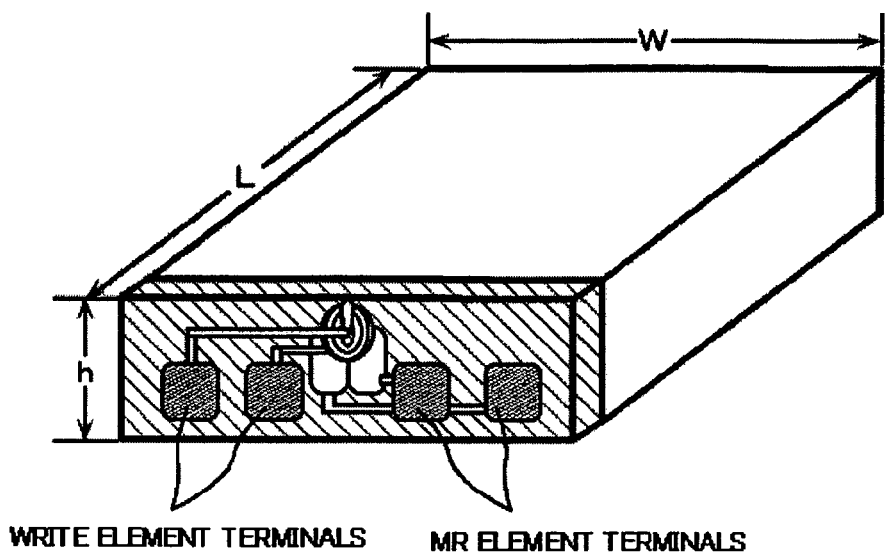
FIG. 4 is a perspective view showing a conventional thin film magnetic head.

Shown in FIG. 4 are the shapes of MR element terminals and write element terminals formed on an element formation face of a slider of a conventional thin film magnetic head.

Note that, though the upper shield film 8 of the MR head is used also as the lower magnetic film of the write head in the above described thin film magnetic head, the upper shield film 8 and the lower magnetic film may be separately provided.

Figure 5:
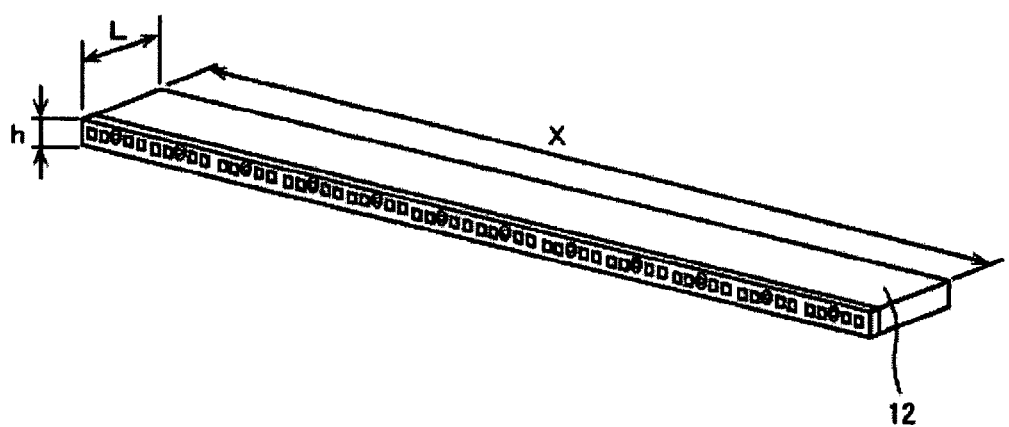
FIG. 5 is a view showing an appearance of the row bar.
Figure 6:
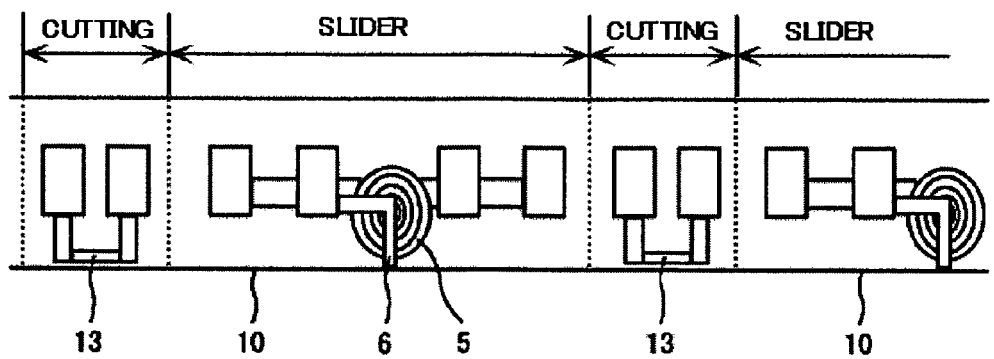
FIG. 6 is a partial enlarged view of the row bar.
Figure 7A:
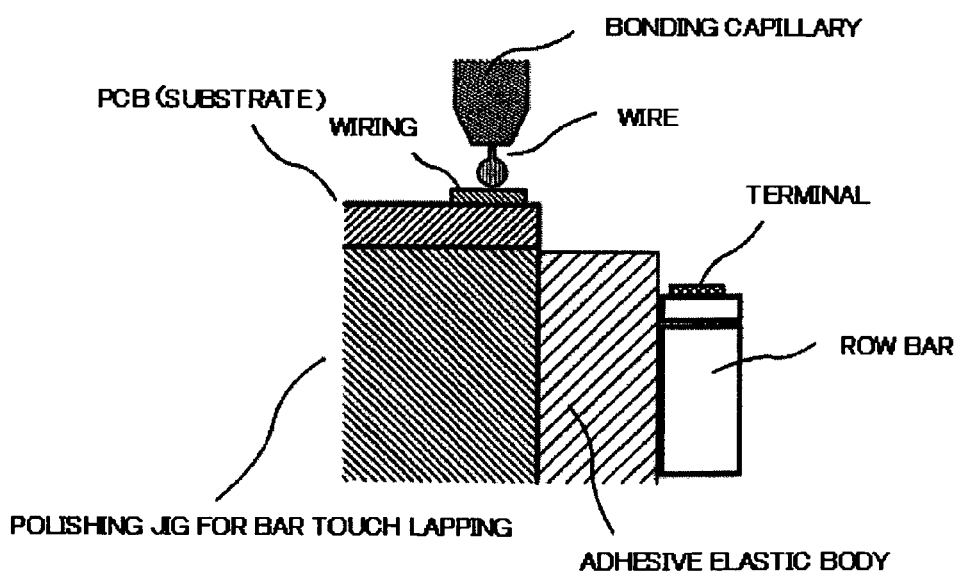
FIG. 7A is a sectional view showing equipment for wire bonding a terminal of an MR element to wiring of a PCB substrate.
Figure 7B:
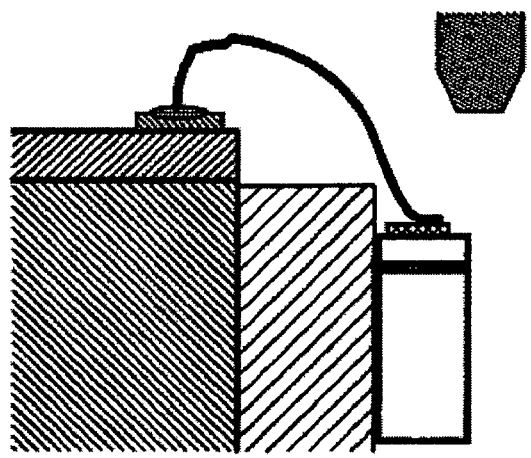
FIG. 7B is a sectional view showing a positional relationship between the row bar and a bonding capillary in wire bonding the MR element terminal to the PCB substrate wiring.
Figure 7C:
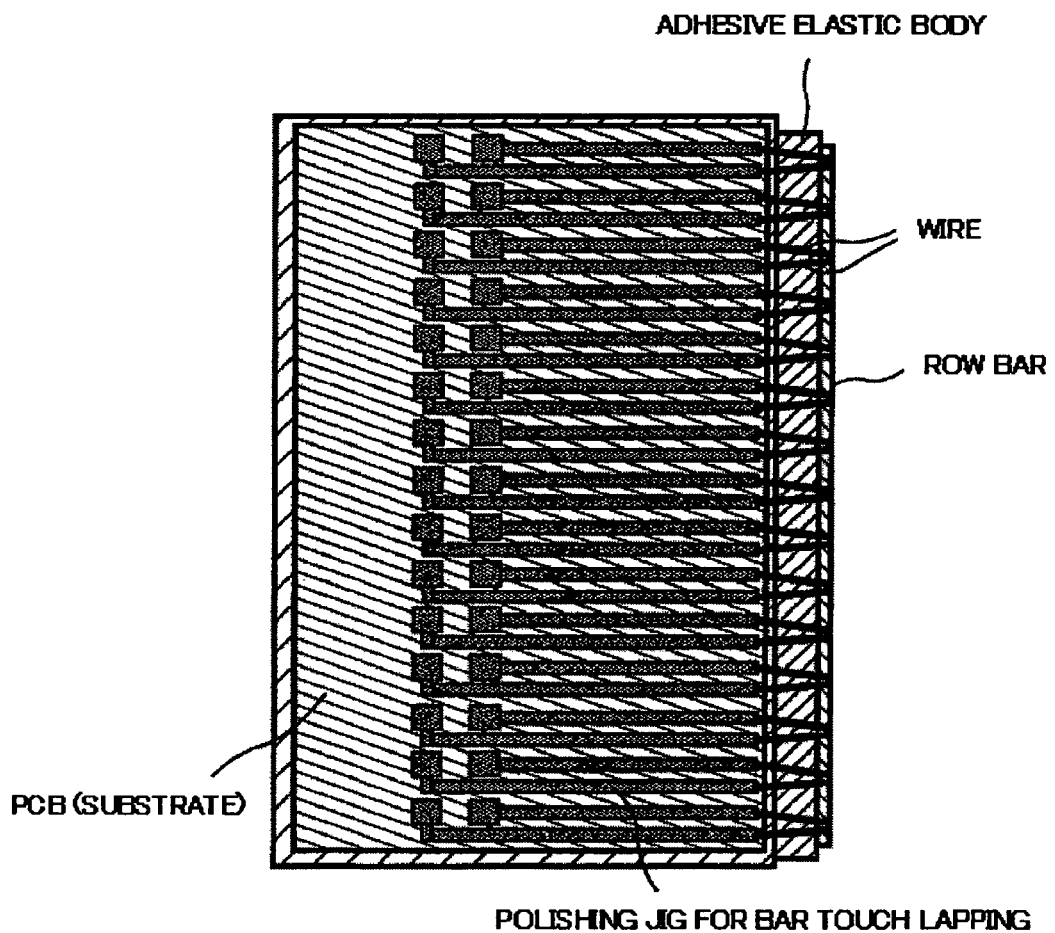
FIG. 7C is a top view showing a state in which the MR element terminals near the back face of the slider are wire bonded to the PCB substrate wiring.
Figure 7D:
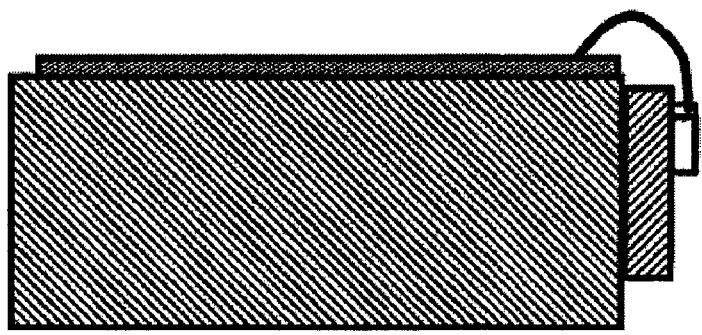
FIG. 7D is a sectional view showing a state in which the MR element terminals near the back face of the slider are wire bonded to the PCB substrate wiring.

Next, the controlling and polishing of the MR element height will be described. FIG. 5 shows the appearance of the row bar. The row bar 12 is composed of a several tens of the sliders 10 formed parallel to one another. The controlling and polishing of the MR element heights is performed on the row bar 12 being in this state. A cutting portion is provided between the adjacent sliders 10 in the row bar 12 as shown in FIG. 6. A resistance detection element 13 for detecting the MR element height during the bearing surface polishing is formed on the cutting portion. A change in resistance of each of the resistance detection elements 13 caused when part of the resistance detection element 13 is removed by the polishing is detected during the polishing. The resistance is then converted into an MR element height to monitor a distribution of MR element heights in the row bar 12. This is a general method for measuring an MR element height. In the element height controlling and polishing process, a polishing pressure applied to the row bar 12 is controlled so as to level off the distribution of MR element heights. More specifically, the polishing pressure for a portion at which the MR element height is larger is increased, and the polishing pressure for a portion at which the MR element height is smaller is decreased, thus controlling the MR element heights in the row bar 12.

The slider of the currently available thin film head usually has the size of the so-called picoslider. As shown in FIG. 4, the picoslider has a width w of 1.0 mm, a length L of 1.2 mm, and a height h of 0.3 mm. The row bar 12 shown in FIG. 5 has a length L of 1.2 mm, a width X of 40 to 80 mm, and a height h of 0.30 to 0.33 mm. The width X of the row bar 12 is remarkably larger than the other dimensions since the number of sliders is increased with the increase in width X of the row bar 12 leading to improvement in productivity.

However, when the width X of the row bar 12 is increased, the rigidity of the row bar 12 is reduced, thereby becoming liable to cause the quadratic curve component and a higher order curve component (called waviness component) which is higher than a tertiary curve. When the quadratic curve component and the waviness component occur in the row bar 12, the quadratic curve component and the waviness component occur also in the MR elements of the row bar 12. It is relatively easy to correct the quadratic cure component of an MR element alignment, but it is difficult to correct the waviness component of the MR element alignment. Therefore, it is probable that the waviness component that has not been corrected deteriorates the element height accuracy in the element height controlling and polishing process.

Next, the bar touch lapping process will be described. Since the offset load is applied to the row bar 12 to control the element heights in the above described element height controlling and polishing process, the following problems are raised.

(1) The offset load degrades the flatness of the bearing surface after the polishing.

(2) The offset load degrades the adhesion between the air bearing surface and the polishing stool surface, increasing a surface coarseness and residual steps.

In order to solve the above problems, the air bearing surface polishing is divided into two steps, namely, the element height controlling and polishing step and the bar touch lapping step. The bar touch lapping is air bearing surface polishing performed for the purpose of improving the flatness, the surface coarseness, and the residual steps of the bearing surface. Its process steps are as follows:

(1) An adhesive elastic sheet is attached to a polishing jig, and a row bar is fixed on the surface of the elastic sheet.

(2) The polishing jig to which the row bar is attached is fixed to a bar touch lapping board.

(3) A fixed abrasive stool in which diamond abrasive grains are buried is rotated while the polishing jig is oscillated.

(4) The row bar and the fixed abrasive stool are oscillated for polishing with the bearing surface of the row bar fixed to the elastic body surface being in contact with the fixed abrasive stool with a constant load.

(5) After a certain polishing period, the row bar is detached from the fixed abrasive stool surface together with the polishing jig, thereby terminating the polishing.

In the bar touch lapping, it is possible to make the row bar follow the stool by pressing the row bar against the fixed abrasive stool via the elastic body. Thus, the adhesiveness between the air bearing surface of the row bar and the fixed abrasive stool can be improved to reduce variation in the bearing surface flatness of the row bar simultaneously with reducing the surface coarseness and the residual steps. However, the following problems are detected with the bar touch lapping.

(1) Since an inner peripheral speed is higher than an outer peripheral speed on the polishing stool, a slope is liable to occur in a distribution in amounts of processing of the row bar.

(2) When a variation in thickness of the elastic body on which the row bar is attached is large, the distribution in amounts of the row bar occurs in accordance with the variation in thickness.

(3) Excessive processing or insufficient processing occurs depending on the settings of the processing period of the bar touch lapping.

Owing to the above three problems, a distribution in the amount of polishing (hereinafter referred to as a variation in the amount of processing) occurs in the bar touch lapping. Since the variation in amount of processing deteriorates the MR element height accuracy, the variation is a significant problem in the MR head manufacturing process.

One of methods of reducing the variation in amount of processing in the bar touch lapping is resistance control bar touch lapping. In the resistance control bar touch lapping, resistances of MR elements are monitored during processing and a polishing load distribution applied to the row bar is controlled so as to keep the resistances at a target value. Since it is necessary to read the resistances of the MR elements (ELG elements) in the resistance control bar touch lapping, two terminals connected to each of the MR elements on the row bar are connected to the wiring of a PCB substrate serving as a circuit substrate by wire bonding. By connecting a wiring terminal of the PCB substrate to a resistance measurement circuit with a pin, it is possible to detect the resistances of the MR elements during the polishing. The wire bonding has the following drawbacks.

(1) Since the row bar is adhered to a position 0.2 to 1 mm far from a facet of the adhesive elastic body when the row bar is fixed to the adhesive elastic body, a bonding capillary or a tool comes in contact with the adhesive elastic body when the wire bonding is applied to a position close to the back face of the row bar. Thus, the application of the wire boding is difficult.

(2) Also, wedge bonding by which wire residue is reduced is generally employed as a method of applying the wire bonding to the terminals of the row bar. In this case, since the PCB substrate to which the terminals are to be connected is located on the back face of the row bar, the wire is extended from the terminals to the back face of the row bar in the wedge bonding. In this case, when the wire bonding is applied to a position close to the back face of the row bar, the wire interferes with the facet of the adhesive elastic body to cause a tensile force on the wire. Thus, the wedge bonding is liable to cause wire bonding failure.

Since the wire bonding has the above drawbacks, it is necessary to apply the wire bonding to a position as close to the air bearing surface as possible with respect to each of the terminals connected to the MR element.

Figure 8A:
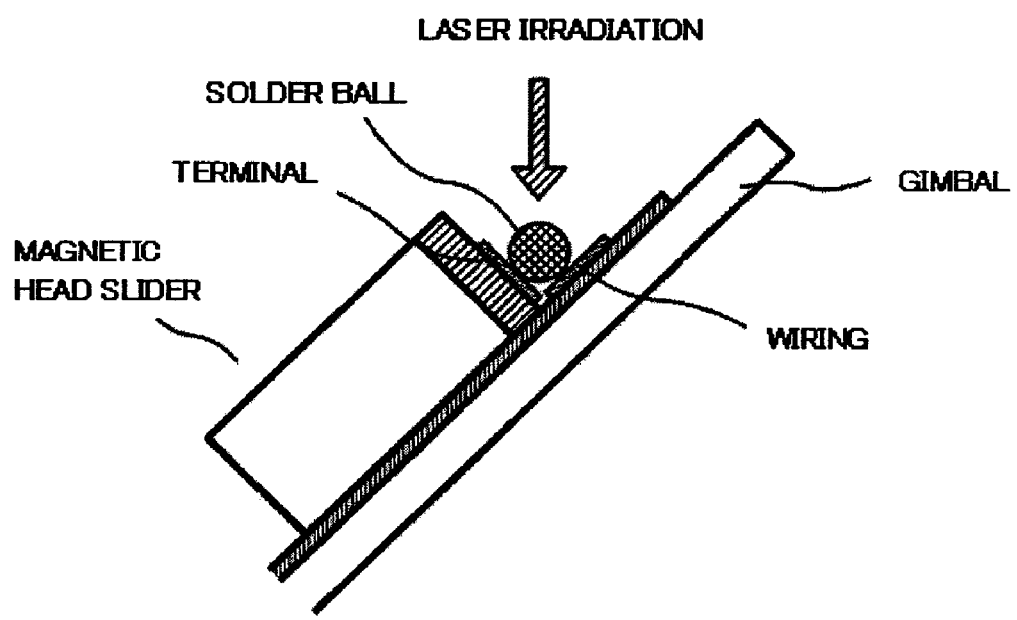
FIG. 8A is a sectional view showing equipment for solder bonding wiring of a gimbal to the MR element terminal and a terminal of a read element.
Figure 8B:
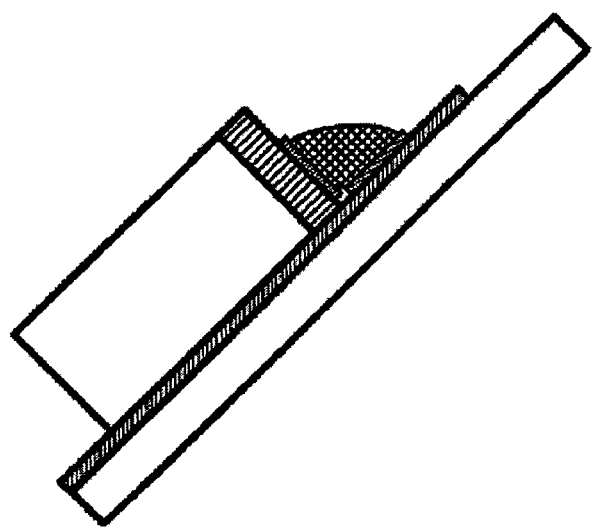
FIG. 8B is a sectional view showing a state in which the gimbal wiring is solder bonded to the terminals of the MR element and the write element.

On the other hand, an assembly process for assembling the slider and the gimbal includes a process of connecting the write element and the MR element to a control circuit of the magnetic disk drive. In the process, as shown in FIGS. 8A and 8B, solder bonding using a solder ball is employed for connecting the wiring on the gimbal, the write element, and the terminals of the MR element to one another. When a distance between the terminals to be connected is increased in the wire bonding, a portion near the center of solder serving as a connecting material is tied up. This deteriorates its connection reliability. Therefore, it is desirable that the terminals of the write element and the MR element are positioned as close to the slider back face as possible in the solder bonding. Further, if the solder is spread over the terminals to wet the terminals in the case where a height of each of the terminal is larger than a width thereof in the solder bonding, a portion near the center of the solder is tied up, thereby deteriorating the connection reliability.

Owing to the above drawbacks of the solder bonding, each of the terminals connected to the read element and MR element of the thin film magnetic head is required to be as similar to a square as possible and to be disposed at a position close to the back face of the slider.

Also, for the slider, two technological developments are proceeding. One of them is the development of a femtoslider. The femtoslider has a width b of 0.7 mm, a length L of 0.85 mm, and a height h of 0.23. The femtoslider has the following advantages as compared with the picoslider.

(1) Since the slider size is smaller, the number of sliders to be obtained from one wafer is increased about 1.5 times.

(2) In the case where a diameter of a disk (recoding medium) is reduced, an area for recording on the disk is increased as compared with the picoslider.

Owing to the above advantages, thin film magnetic head manufacturers are developing femtoslider bulk production technologies. Since the femtoslider has the smaller slider size as compared to the picoslider, the size of the terminals to be connected to the write element and the read element should be reduced. Therefore, the above problems of the wire bonding and the solder bonding are raised.

The other is the development of a TFC (Thermal Flying Height Control) head which is a magnetic head slider with heaters. The heaters heat the vicinities of the write element and the read element to protrude them by nanometer order, thereby controlling a distance (flying height) between a recording medium and the write/read elements. Since terminals to be connected to the heaters are required, the number of terminals on an element formation face of the TFC slider is 6 (see FIG. 11). Therefore, a width of each of the terminals is narrowed in the TFC slider as compared to the conventional four-terminal slider. Accordingly, the problems relating to the wire bonding and the solder bonding become more significant.

The present invention solves the problems relating to the wire bonding for the resistance control bar touch lapping in the polishing process and the problems relating to the solder bonding in the assembly process through the terminal structure of the thin film magnetic head. Thus, the invention reduces bonding failure and improves the connection reliability.

Figure 9:
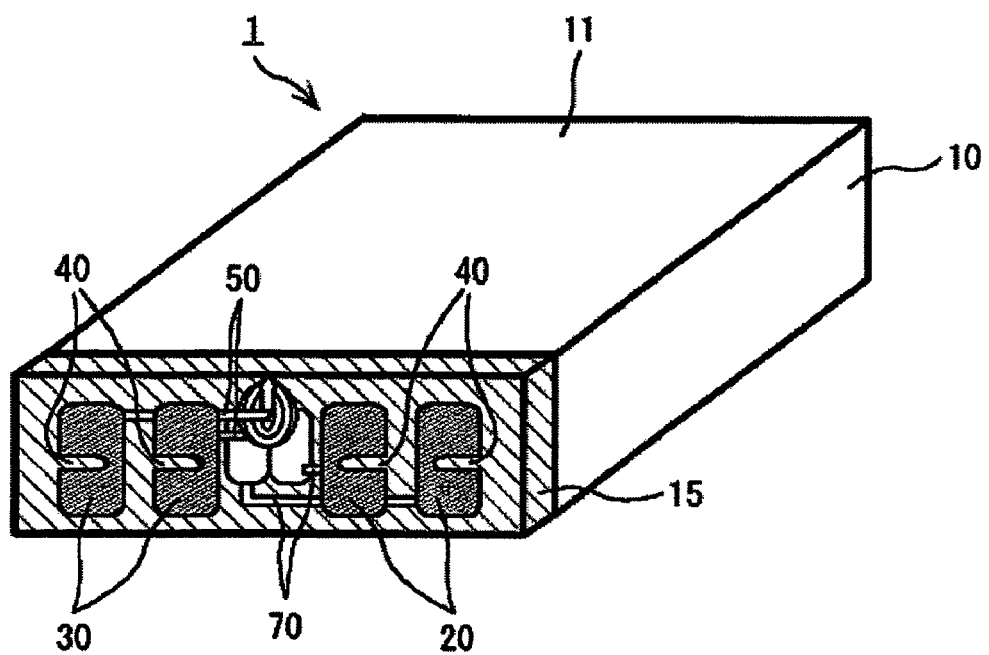
FIG. 9 is a perspective view showing a thin film magnetic head on which a terminal structure according to an embodiment of the invention is formed.

FIG. 9 is a diagram showing the shapes of MR element terminals 20 and write element terminals 30 which are formed on an element formation face 15 of a slider 10 according to one embodiment of the invention. A slit 40 extending in a direction of a width of the element formation face 15 is formed in each of the MR element terminals 20 and the write element terminals 30, so that each of the MR element terminals 20 and the write element terminals 30 is substantially sectioned by the slit in a direction of a height of the slider 10. The MR element terminals 20 and the write element terminals 30 are connected to each other by way of connection portions on each of which the slit 40 is not formed. The MR head and write head are stacked as described above on the element formation face 15 of the slider 10. A lead wire 70 connected to electrodes 7 of the MR head is connected to the MR element terminals 20 via a copper stud. An outgoing line 50 from coils 5 of the write head is connected to the write element terminals 30 via a copper stud. The stack body of the MR head and the write head, the lead line 70, the coil outgoing line 50 are covered with a protection film made of alumina, and the MR element terminals 20 and the write element terminals 30 are formed on the alumina protection film.

Figure 10:
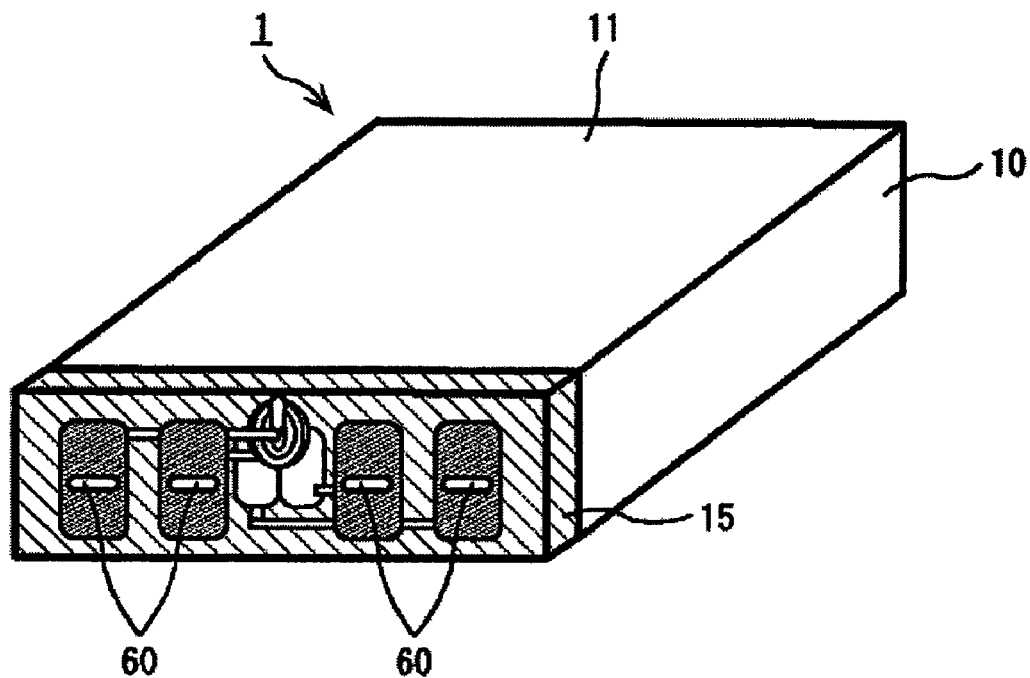
FIG. 10 is a perspective view showing a thin film magnetic head on which a terminal structure according to another embodiment of the invention is formed.

FIG. 10 is a diagram showing the shapes of MR element terminals 20 and write element terminals 30 which are formed on an element formation face 15 of a slider 10 according to another embodiment of the invention. A slit 60 extending in a direction of a width of the element formation face 15 is formed on the center of each of the MR element terminals 20 and the write element terminals 30, so that each of the MR element terminals 20 and the write element terminals 30 is substantially sectioned by the slit in the a direction of a height of the slider 10. The slit 60 is formed in the inside of each of the terminals, and both ends of the slit 60 serve as connection portions.

Figure 11:
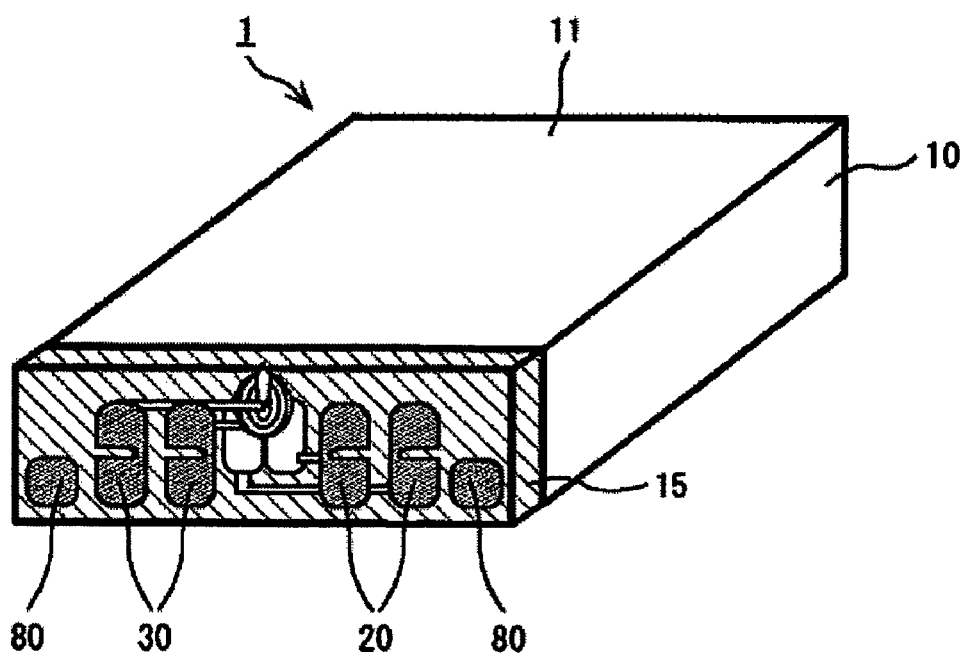
FIG. 11 is a perspective view showing a TFC thin film magnetic head on which the terminal structure according to another embodiment of the invention is formed.

FIG. 11 is a diagram showing the shapes of MR element terminals 20 and write element terminals 30 which are formed on an element formation face 15 of a TFC slider 14 according to yet another embodiment of the invention. The slit 40 of the first embodiment is formed in each of the MR element terminals 20 and the write element terminals 30. Heater terminals 80 connected to a heater are disposed separately beside one of the MR element terminals 20 and one of the write element terminals 30.

Figure 12:
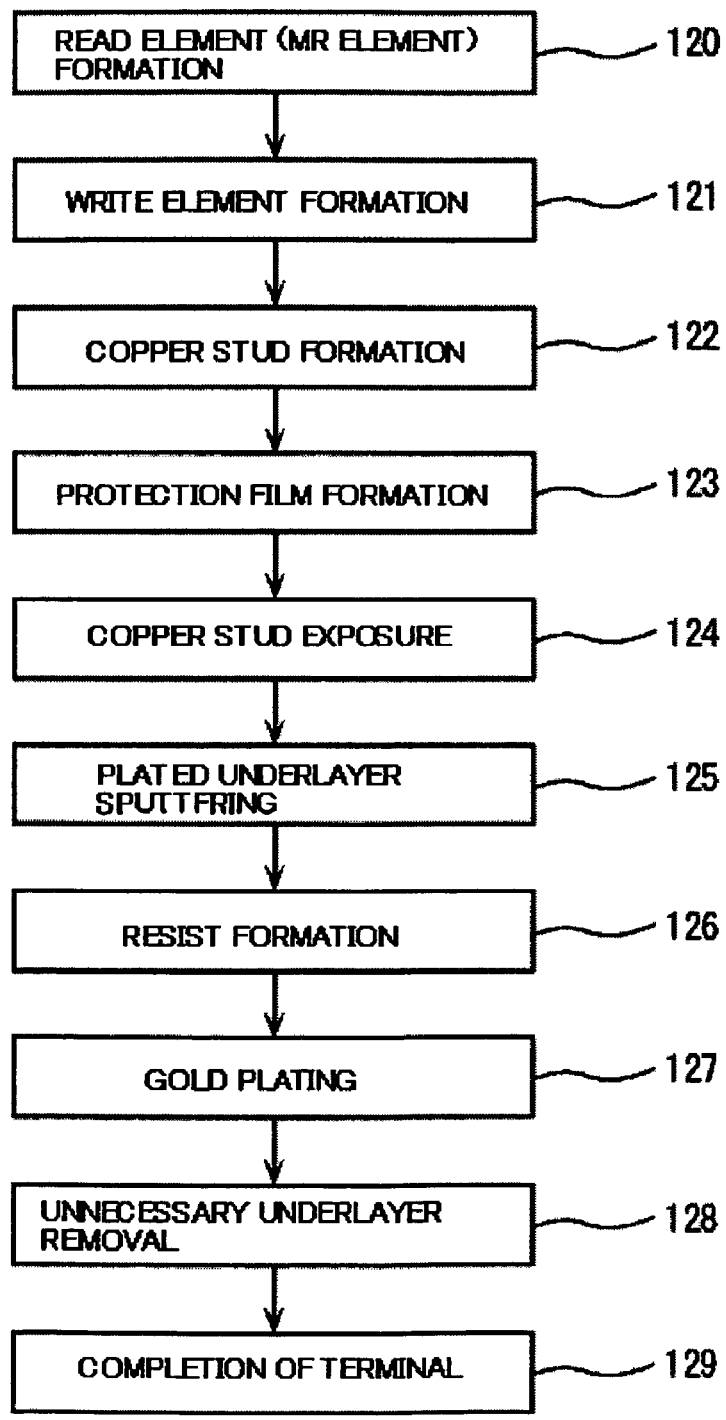
FIG. 12 is a diagram showing process steps form the formation of the head element to the formation of the terminal structure of the embodiment of the invention.

Shown in FIG. 12 is a flowchart of process steps from the formation of the MR element 4 and the write element 5, 6, and 8 to the formation of terminals of the MR element 4 and the write element. As described in the foregoing with reference to FIG. 3, the MR elements 4 and the write element 5, 6, and 8 are formed on the surface of the ceramic wafer 3 by way of the thin film processing such as sputtering, mask-formation, and etching (Steps 120 and 121). Then, the copper stud which is connected to the lead line 70 of the electrodes 7 of the MR element as well as to the coil outgoing line 50 of the write element is formed by plating (Step 122). Then, the alumina protection film is formed on the MR element, the write element, and the copper stud by sputtering (Step 123). After that, the protection film is polished until the copper stud is exposed (Step 124). Then, a plating underlayer film is formed on the copper stud and the alumina protection film by sputtering (Step 125). After that, resist is formed on a portion on which the slit is formed, and the portion being other than a region on which the terminals are formed (Step 126). Then, gold plating is applied to the portion which is not covered with the resist (Step 127). Then, unnecessary portion of the plating underlayer is removed (Step 128) to complete the MR element gold terminals 20 each having the slit 40 or 60 and the write element gold terminals 30 (Step 129).

Although the MR element terminals 20 and the write element terminals 30 are formed by gold plating in the foregoing embodiment, it is possible to use suitable metal plating other than the gold plating. Further, it is desirable to use a stack film of Cu and Cr as the plating underlayer.

Figure 13:
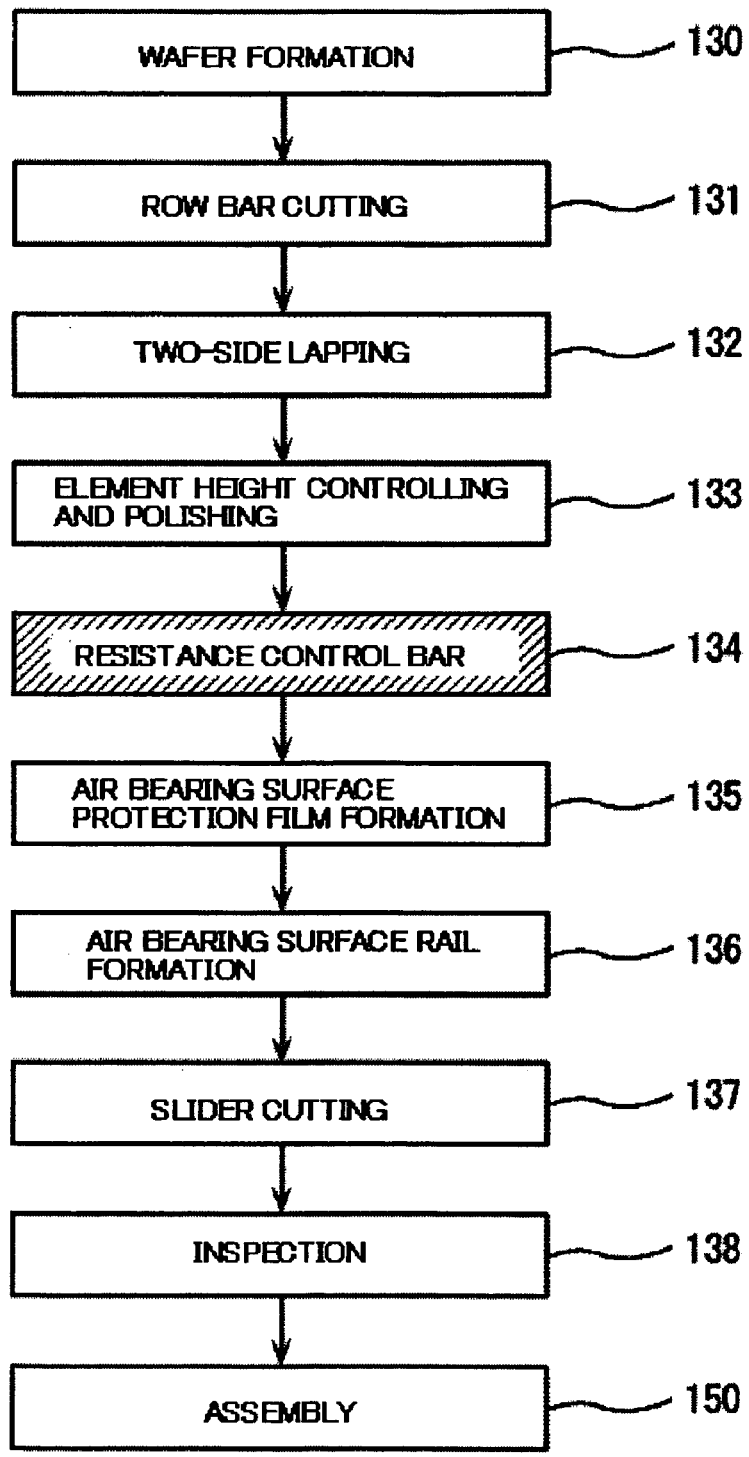
FIG. 13 is a diagram showing process steps of processing on a bearing surface of the thin film magnetic head.

Next, an effect of the terminal structures of the above embodiments will be described in conjunction with the slider formation process and the gimbal assembly process of the thin film magnetic head. The process steps are shown in FIG. 13. Reference should be made also to FIGS. 3 to 6.

Step 130: In a wafer formation step, the MR elements 4, the write elements 5, 6, and 8, and the resistance detection elements 13 are formed in the wafer by the thin film processing such as sputtering, ion milling, and photolithography.

Step 131: In a row bar cutting step, the wafer 3 is cut into the row bars 12 by slicing using a diamond cutting grindstone.

Step 132: In a two-side lapping step, the air bearing surface 11 and its back face are simultaneously polished so as to reduce the amount of quadratic curve and waviness of the row bars 12 which occur in a substrate cutting step.

Step 133: An MR element height controlling and polishing step is a polishing process for controlling the element heights. An offset load is applied to the row bar 12 to form a distribution in amount of processing in the row bar 12. The distribution in amount of processing is controlled so as to control the element heights. Resistances of the resistance detection elements 13 are measured in this step so as to in-process measure the element heights during the polishing.

Step 134: A resistance control bar touch lapping step is a process for polishing the bearing surface 11 performed for the purposes of: achieving the high accuracy of the MR element heights; improving the flatness (crown, camber, twist) of the bearing surface; improving the surface coarseness of the bearing surface; and reducing a residual steps. In this embodiment, in order to suppress deterioration in accuracy of the MR element heights in the bar touch lapping, an actual element detection method of measuring resistances of the MR elements themselves is employed.

Step 135: In a bearing surface protection film formation step, a film having a thickness of 3 to 6 mm is formed after the resistance control bar touch lapping in order to protect the MR elements 4 and the write elements which are exposed to the bearing surface 11. The protection film comprises an underlayer made of Si and a layer made of a diamond-like carbon formed on the underlayer.

Step 136: In an air bearing surface rail formation step, in order to allow the slider 10 to fly at a flying height of 10 to 20 nm from the rotary disk surface, it is necessary to control dynamic pressures of the disk 2 and the slider 10. Accordingly, a rail having two or three steps is formed on the bearing surface 11 to balance a lifting force (positive pressure) and a force (negative pressure) attracting the bearing surface 11 to the disk surface, thereby allowing the slider 10 to fly at a predetermined flying height. The rail is formed on the bearing surface 11 by photolithography processing, ion milling RIE, or the like.

Step 137: In a slider cutting step, the row bar 12 is cut into sliders 10 by slicing using the diamond cutting grindstone.

Step 138: In an inspection step, after the row bar 12 is cut, the characteristic measurement and appearance check of the MR elements 4 are performed to output only conforming articles to an assembly step 150.

Figure 14:
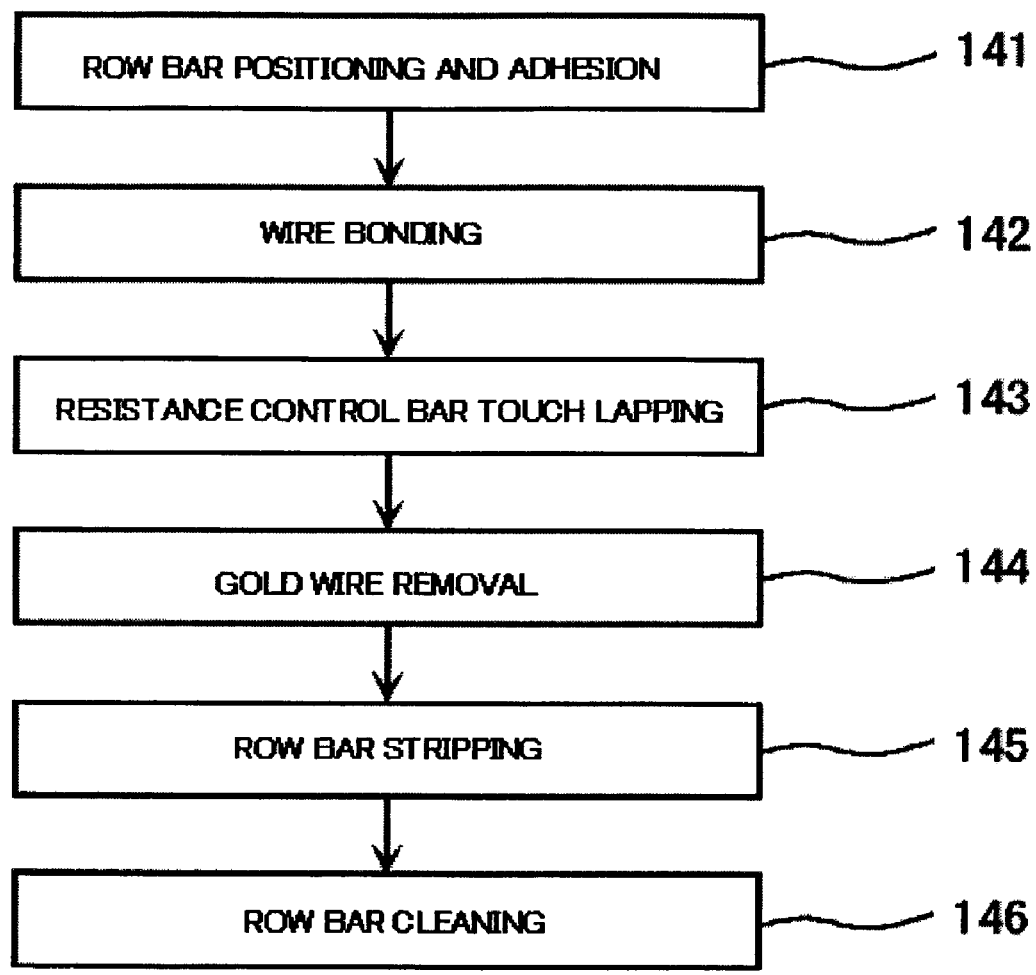
FIG. 14 is a diagram showing process steps of a resistance control bar touch lapping in the bearing surface processing.

Next, details of the resistance control bar touch lapping step (Step 134) included in the above process steps will be described with reference to FIG. 14.

Step 141: In a row bar positioning and adhesion step, the row bar is positioned and fixed to a polishing jig for bar touch lapping via an adhesive elastic body (polyurethane sheet).

Step 142: In a wire bonding process, as described above with reference to FIGS. 7A to 7D, terminals of each of the MR elements and wiring of a resistance measurement circuit substrate (PCB substrate) are electrically connected to each other by the use of a ball wire bonding device using a gold wire. In this embodiment, the wire bonding is applied to 15 thin film magnetic heads 1 per row bar 12. It is possible to apply the bonding to a terminal portion near the air bearing surface 11 on each of the terminals 20 that is sectioned by the slit 40 of the MR element 4. Therefore, the problem does not occur in which the bonding cannot be performed due to the contact of the bonding capillary to the adhesive elastic body. Further, the problem of the bonding failure due to the interference of the wire with the facet of the adhesive elastic body does not occur.

Step 143: In the resistance control bar touch lapping step, resistances of the MR elements 4 on the 15 thin film magnetic heads 1 during the polishing process are detected. Depending on each of the values of the resistances, a polishing load to be applied to the thin film magnetic head 1 near the detection site is changed, thereby controlling the resistances (on the 15 points) of the MR elements 4 in the row bar 12 to the same level. Then, the polishing is terminated when an average resistance of the 15 MR elements reaches the target resistance. Thus, it is possible to adjust the MR element heights with a high degree of accuracy and to improve the surface coarseness, the flatness, and the residual steps.

Step 144: In a wire removing step, the wire of the wire bonding is removed after the termination of the polishing.

Step 145: In a row bar stripping step, the row bar after the polishing is detached from the adhesive elastic body by applying force to the lateral face of the row bar 12.

Step 146: In a row bar cleaning step, the row bar 12 after the stripping is cleaned by the use of an ultrasonic cleaning device.

Figure 15:
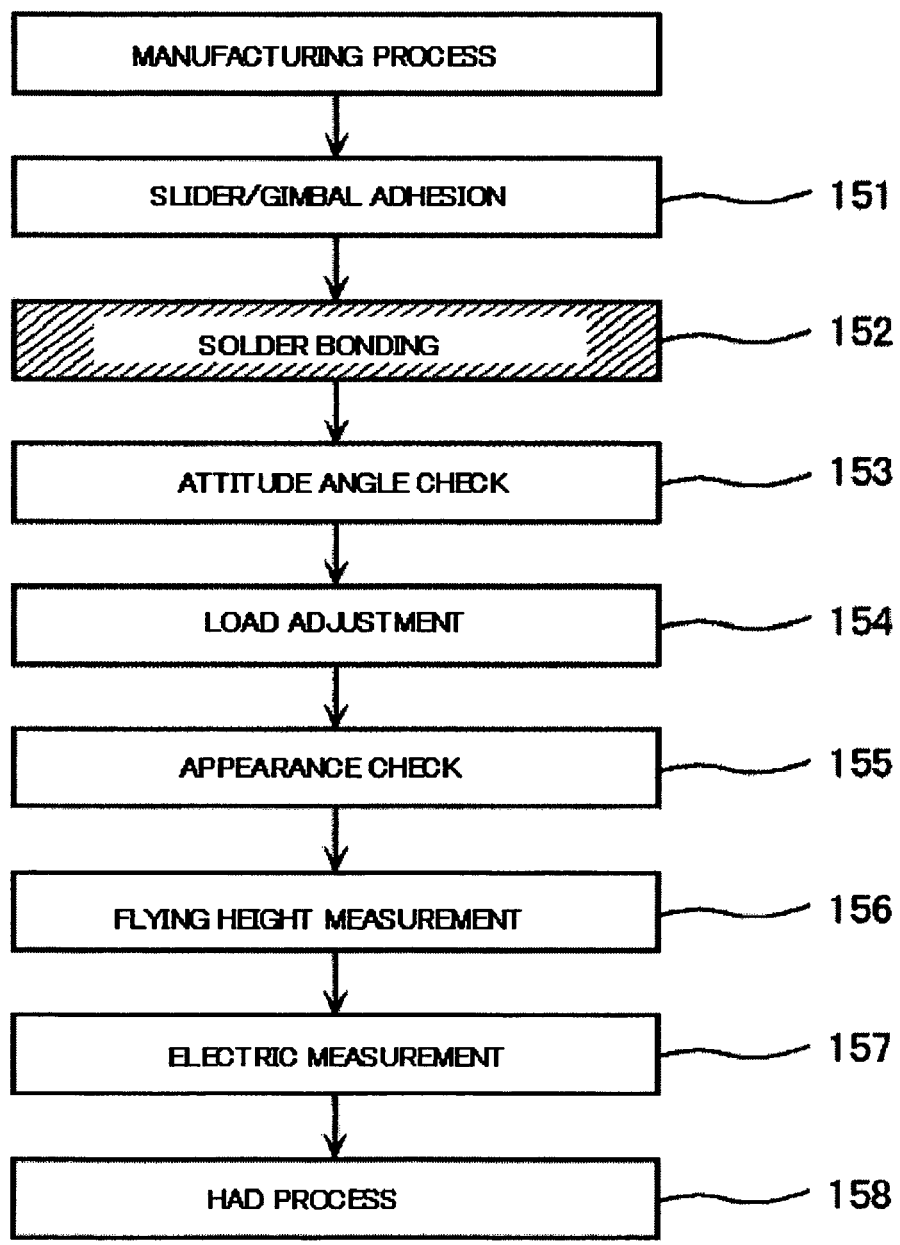
FIG. 15 is a diagram showing process steps of assembling the thin film magnetic head and the gimbal.

Next, the assembly process will be described with reference to FIG. 15. Reference should also be made to FIGS. 8A, 8B, and 9.

Step 151: In a slider/gimbal adhesion step, a certain amount of an adhesive is applied on the back face of the slider 10 to adhere the slider on a predetermined position of the gimbal.

Figure 16:
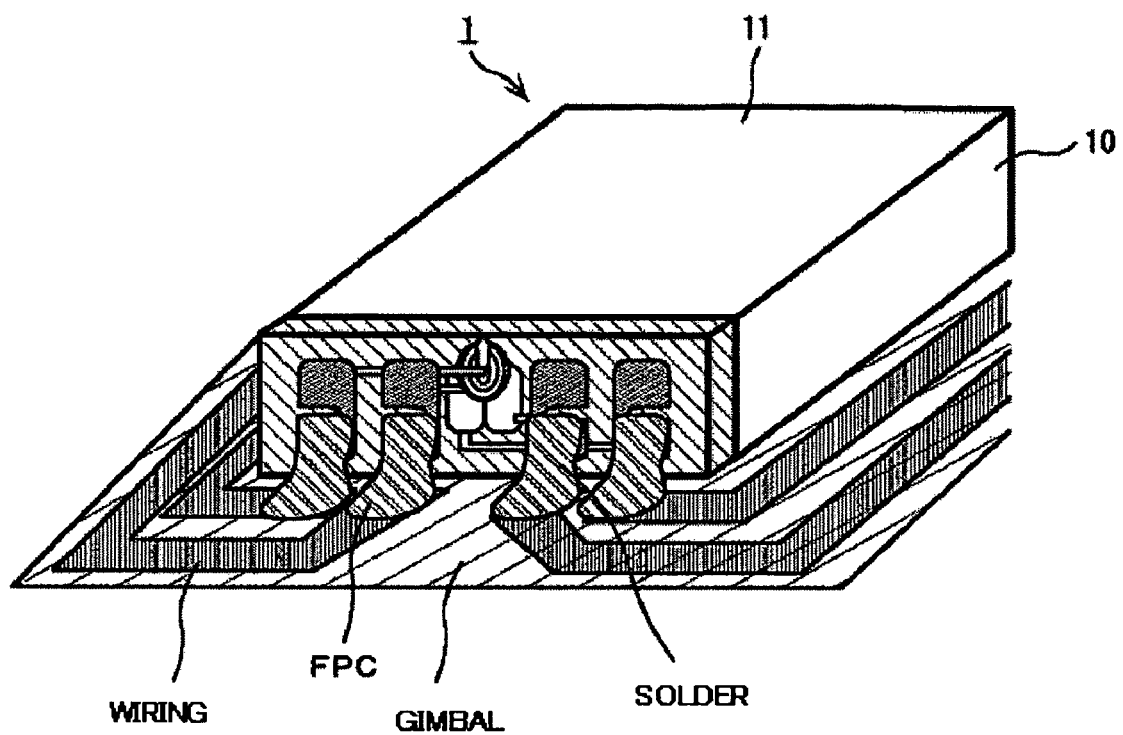
FIG. 16 is a perspective view showing a state in which portions, near the back face of the slider, of the MR element terminal and the write element terminal are soldered to wiring of the gimbal.

Step 152: In a solder bonding step, wiring of an FPC (flexible circuit substrate) that is integrated with the suspension and the gimbal is bonded to the terminals 20 and 30 of the thin film magnetic head 1 by soldering. The gimbal on which the slider 10 is adhered is tilted 45 degrees, and a solder ball is placed between the FPC wiring and the terminals 20 and 30 of the slider 10. In this case, the solder ball is in contact with terminal portions, near the back face of the slider, of the terminals 20 and 30 each of which is sectioned by the slit 40 as shown in FIG. 9. Then, as shown in FIG. 8A, the solder ball is irradiated with a laser beam to be melted with the heat of the laser beam, so that the terminal portions near the back face of the slider 10 are electrically connected to the FPC wiring. The connection state is shown in FIG. 16. Since the solder is connected to the terminal portions near the back face of the slider 10 as shown in FIG. 16, a distance between the connected terminals is reduced, so that the problem of tying up of the center portion of the solder will not be raised. Further, since a height of each of the terminals sectioned by the slit 40 from the slider back face is lowered, the problem of the tying up of the solder center portion due to spread of the solder is eliminated.

Step 153: In an attitude angle checking step, an angle of the slider 10 when the slider 10 flies above the disk surface is measured and adjusted.

Step 154: In a load adjustment step, a load with which the slider 10 is pressed against the disk 2 when the slider 10 flies above the disk surface is measured and adjusted.

Step 155: In an appearance checking step, inspections are made on contamination on the slider suspension and the solder connection.

Step 156: In a flying height measurement step, the slider 10 is allowed to fly above the magnetic disk 2 for measurement of its flying height h.

Step 157: In an electric measurement step, operations of writing/reading on/from the magnetic disk 2 are performed to evaluate magnetic head characteristics. After the electric measurement, the thin film magnetic head 1 and the magnetic disk 2 are delivered to an HDA process for assembling.

According to the embodiment of the invention described above, the following effects are achieved by forming the slit in each of the terminals of the thin film magnetic head and by using one (near the air bearing surface) of the terminal portions of the terminal sectioned by the slit for the wire bonding in the polishing process and the other terminal portion (near the back face) for the solder bonding in the assembly process. It is possible to reduce the bonding failure in the wire bonding for the actual element detection. Thanks to the reduction in bonding failure, it is possible to control the MR element resistances with high accuracy in the bearing surface polishing, thereby achieving the high accuracy in controlling the MR element heights. Further, owing to the improvement in the MR element height accuracy, the read output of the MR head is stabilized as well as the yield of the thin film magnetic head manufacturing process is improved. Further, since the tying up at the solder center portion does not occur in the solder bonding in the assembly process, the connection reliability of the solder bonding is improved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A thin film magnetic head comprising:
   a slider having an element formation surface;
   a read element formed on the element formation surface of the slider;
   a write element formed on the element formation surface of the slider;
   a read element terminal which is formed on the read element and the write element via an insulator and is connected to the read element, the read element terminal having a slit extending in a direction of a width of the element formation surface; and
   a write element terminal connected to the write element.

2. The thin film magnetic head according to claim 1, wherein the read element terminal is sectioned in a height direction of the slider by the slit.

3. The thin film magnetic head according to claim 1, wherein the read element terminal has a rectangular shape elongated in a height direction of the slider and a connection portion not formed with the slit.

4. The thin film magnetic head according to claim 1, wherein the read element terminal has a rectangular shape elongated in a height direction of the slider and connection portions on both sides of the slit.

5. The thin film magnetic head according to claim 1, further comprising:
   a heater formed on the element formation surface; and
   a heater terminal formed on the insulator and connected to the heater.

6. The thin film magnetic head according to claim 1, wherein the slider has a width of about 0.7 mm, a height of about 0.23 mm, and a length of about 0.85 mm.

7. A thin film magnetic head comprising:
   a slider having an element formation surface;
   a read element and a write element both of which are formed on the element formation surface of the slider;
   a read element terminal which is formed on the read element and the write element via an insulator and is connected to the read element, the read element terminal having a slit extending in a direction of a width of the element formation surface; and a write element terminal which is connected to the write element, the write element terminal having a slit extending in a width direction of the element formation surface.

8. The thin film magnetic head according to claim 7, wherein each of the read element terminal and the write element terminal is sectioned in a height direction of the slider by the slit.

9. The thin film magnetic head according to claim 7, wherein each of the read element terminal and the write element terminal has a rectangular shape elongated in a height direction of the slider and a connection portion not formed with the slit.

10. The thin film magnetic head according to claim 7, wherein each of the read element terminal and the write element terminal has a rectangular shape elongated in a height direction of the slider and connection portions on both sides of the slit.

11. The thin film magnetic head according to claim 7, further comprising:
a heater formed on the element formation surface; and
a heater terminal formed on the insulator and connected to the heater.

12. The thin film magnetic head according to claim 7, wherein the slider has a width of about 0.7 mm, a height of about 0.23 mm, and a length of about 0.85 mm.

13. A thin film magnetic head comprising:
a slider having an element formation surface;
a read element which is formed on the element formation surface of the slider and has a magneto resistive element provided with electrodes formed on both ends thereof;
a write element which is formed on the element formation surface of the slider and has coils;
a read element terminal which is formed on the read element and the write element via an insulator and is connected to the electrodes, the read element terminal having a slit extending in a direction of a width of the element formation surface; and
a write element terminal which is connected to the coils, the write element terminal having a slit extending in the width direction of the element formation surface.

14. The thin film magnetic head according to claim 13, wherein each of the read element terminal and the write element terminal is sectioned in a height direction of the slider by the slit.

15. The thin film magnetic head according to claim 13, wherein each of the read element terminal and the write element terminal has a rectangular shape elongated in a height direction of the slider and a connection portion not formed with the slit.

16. The thin film magnetic head according to claim 13, wherein each of the read element terminal and the write element terminal has a rectangular shape elongated in a height direction of the slider and connection portions on both sides of the slit.

17. The thin film magnetic head according to claim 13, further comprising:
a heater formed on the element formation surface; and
a heater terminal formed on the insulator and connected to the heater.

18. The thin film magnetic head according to claim 13, wherein the slider has a width of about 0.7 mm, a height of about 0.23 mm, and a length of about 0.85 mm.

19. A head gimbal assembly comprising:
a thin film magnetic head including:
a slider having an element formation surface;
a read element which is formed on the element formation surface of the slider and has a magneto resistive element provided with electrodes formed on both ends therof;
a write element which is formed on the element formation surface of the slider and has coils;
a read element terminal which is formed on the read element and the write element via an insulator and is connected to the electrodes, the read element terminal having a slit extending in a direction of a width of the element formation surface; and
a write element terminal which is connected to the coils, the write element terminal having a slit extending in the width direction of the element formation surface; and
a gimbal on which wiring is formed and a back face of the slider of the thin film magnetic head is adhered, the wiring being solder-bonded to a terminal portion, near the back face of the slider, of each of the read element terminal and the write element terminal.

20. The head gimbal assembly according to claim 19, wherein each of the read element terminal and the write element terminal is sectioned in a height direction of the slider by the slit.

* * * * *

UNITED STATES PATENT AND TRADEMARK OFFICE
CERTIFICATE OF CORRECTION

PATENT NO. : 7,554,769 B2  Page 1 of 1
APPLICATION NO. : 11/101189
DATED : June 30, 2009
INVENTOR(S) : Yamakura et al.

It is certified that error appears in the above-identified patent and that said Letters Patent is hereby corrected as shown below:

In The References Cited:
Cover page, (56) References Cited, Foreign Patent Documents, please delete "JP 2003-167274" and insert -- JP 2003-168274 --.

In The Claims:
Claim 19, column 14, line 25, please delete "therof" and insert -- thereof --.

Signed and Sealed this

Twenty-second Day of September, 2009

David J. Kappos
*Director of the United States Patent and Trademark Office*